(12) United States Patent
Fang et al.

(10) Patent No.: US 11,243,915 B2
(45) Date of Patent: *Feb. 8, 2022

(54) METHOD AND APPARATUS FOR DATA DEDUPLICATION

(71) Applicant: International Business Machines Corporation, Armonk, NY (US)

(72) Inventors: Min Fang, Shanghai (CN); JiaYang Zheng, Shanghai (CN); GuoFeng Zhu, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 196 days.

This patent is subject to a terminal disclaimer.

(21) Appl. No.: 16/114,442

(22) Filed: Aug. 28, 2018

(65) Prior Publication Data

US 2018/0365262 A1    Dec. 20, 2018

Related U.S. Application Data

(63) Continuation of application No. 14/932,180, filed on Nov. 4, 2015, now Pat. No. 10,089,321.

(30) Foreign Application Priority Data

Dec. 10, 2014 (CN) .......................... 201410755974.0

(51) Int. Cl.
*G06F 16/174* (2019.01)
*G06F 16/14* (2019.01)

(52) U.S. Cl.
CPC ........ *G06F 16/1752* (2019.01); *G06F 16/152* (2019.01)

(58) Field of Classification Search
CPC .......................... G06F 16/1752; G06F 16/152
See application file for complete search history.

(56) References Cited

U.S. PATENT DOCUMENTS

| 8,214,517 B2 | 7/2012 | Dubnicki et al. |
| 8,346,736 B2 | 1/2013 | Haustein et al. |
| 8,645,333 B2 | 2/2014 | Balachandran et al. |

(Continued)

FOREIGN PATENT DOCUMENTS

| CN | 101609449 A | 12/2009 |
| CN | 101882141 A * | 11/2010 |

(Continued)

OTHER PUBLICATIONS

Charikar, M., "Similarity Estimation Techniques from Rounding Algorithms", STOC'02, May 19-21, 2002, Montreal, Quebec, Canada. Copyright 2002 ACM, pp. 380-388.

(Continued)

*Primary Examiner* — Jesse P Frumkin
(74) *Attorney, Agent, or Firm* — Scott Dobson

(57) ABSTRACT

A current file is obtained in the data. It is determined whether a similar historical file exists based on a sampled data block from at least one predetermined location in the current file. In response to non-existence of the similar historical file, the current file and corresponding metadata are stored on a file basis. In response to existence of the similar historical file, a deduplication operation is applied on the current file on a block basis.

20 Claims, 4 Drawing Sheets

(56) References Cited

U.S. PATENT DOCUMENTS

| | | | |
|---|---|---|---|
| 8,898,120 B1* | 11/2014 | Efstathopoulos | G06F 16/11 707/692 |
| 10,877,945 B1* | 12/2020 | Mandic | G06F 16/1748 |
| 2010/0199065 A1 | 8/2010 | Kaneda | |
| 2011/0246741 A1 | 10/2011 | Raymond et al. | |
| 2011/0276744 A1 | 11/2011 | Sengupta et al. | |
| 2012/0166448 A1 | 6/2012 | Li et al. | |
| 2014/0344229 A1 | 11/2014 | Lillibridge et al. | |
| 2016/0165012 A1 | 6/2016 | Li et al. | |
| 2016/0171009 A1 | 6/2016 | Fang et al. | |

FOREIGN PATENT DOCUMENTS

| | | |
|---|---|---|
| CN | 101882141 A | 11/2010 |
| CN | 102323958 A | 1/2012 |
| CN | 103324552 A | 9/2013 |
| CN | 103577278 A | 2/2014 |
| CN | 103970744 A | 8/2014 |

OTHER PUBLICATIONS

Hong et al., "Duplicate Data Elimination in a SAN File System", Proceedings of the 21st IEEE/12th NASA Goddard Conference Mass Storage Systems and Technologies (MSST), Apr. 2004, pp. 301-314.

Krishnaprasad et al., "A Proposal for Improving Data DeDuplication with Dual Side Fixed Size Chunking Algorithm", 2013 Third International Conference on Advances in Computing and Communications, © 2013 IEEE, pp. 13-16. DOI: 10.1109/ICACC.2013.10.

Liu et al., "ADMAD: Application-Driven Metadata Aware De-duplication Archival Storage System", Fifth IEEE International Workshop on Storage Network Architecture and Parallel I/Os, © 2008 IEEE, pp. 29-35. DOI: 10.1109/SNAPI.2008.11.

Lu et al., "Frequency Based Chunking for Data De-Duplication", 2010 18th Annual IEEE/ACM International Symposium on Modeling, Analysis and Simulation of Computer and Telecommunication Systems, © 2010 IEEE, pp. 287-296. DOI: 10.1109/MASCOTS.2010.37.

Quinlan et al., "Venti: a new approach to archival storage", USENIX Association, Proceedings of the FAST 2002 Conference on File and Storage Technologies, Monterey, California, USA, Jan. 28-30, 2002, © 2002 by the USENIX Association, 14 pages.

Sun et al., "DeDu: Building a Deduplication Storage System over Cloud Computing", Proceedings of the 2011 15th International Conference on Computer Supported Cooperative Work in Design, © 2011 IEEE, pp. 348-355.

Won et al., "Efficient index lookup for De-duplication backup system", supported by KOSEF through National Research Lab (ROA—2007-000-20114-0) at Hanyang University, © 2008 IEEE, 3 pages.

Yao et al., "Simdedup: A New Deduplication Scheme Based on Simhash", WAIM 2013 Workshops, LNCS 7901, pp. 79-88, 2013. © Springer-Verlag Berlin Heidelberg 2013.

Zhu et al., "Avoiding the Disk Bottleneck in the Data Domain Deduplication File System", FAST '08: 6th USENIX Conference on File and Storage Technologies, USENIX Association, pp. 269-282.

Anonymous, "Method and System for Data De-Duplication in Two-Stages", An IP.com Prior Art Database Technical Disclosure, 5 pages. IP.com No. 000218982. IP.com Electronic Publication: Jun. 14, 2012.

CN Application 201410755974.0, entitled "Method and Apparatus for Data Deduplication", filed on Dec. 10, 2014, 22 pages.

List of IBM Patents or Patent Applications Treated as Related, Dated Aug. 28, 2018, 2 pages.

* cited by examiner

METHOD AND APPARATUS FOR DATA DEDUPLICATION

BACKGROUND

Embodiments of the present disclosure relate to the field of data storage, and more specifically, to a method and apparatus for data deduplication.

In the era of big data, the amount of data increases exceptionally rapidly. How to effectively utilize existing storage space then becomes an imminent problem to solve. Data deduplication technology is one of the important solutions therefor. Redundant data can be removed by the data deduplication technology, thereby reducing the data that needs to be stored. Deduplication technology has a very wide field of application. It may be applied in a backup process and an archiving process. Further, it may not only be applied in a common file system, but also may be applied in a cloud storage technology.

SUMMARY

According to a first aspect of the present disclosure, there is provided a method for data deduplication. The method may comprise: obtaining a current file in the data; determining whether a similar historical file exists based on a sampled data block from at least one predetermined location in the current file; in response to non-existence of the similar historical file, storing the current file and corresponding metadata with on a file basis; and in response to existence of the similar historical file, applying a deduplication operation on the current file on a block basis.

According to a second aspect of the present disclosure, there is provided an apparatus for data deduplication. The apparatus may comprise: an obtaining module configured to obtain a current file in the data; a similar file determining module configured to determine whether a similar historical file exists based on a sampled data block from at least one predetermined location in the current file; a first storage module configured to, in response to non-existence of the similar historical file, store the current file and corresponding metadata on a file basis; and a second storage module configured to, in response to existence of the similar historical file, apply a deduplication operation on the current file on a block basis.

According to a third aspect of the present disclosure, there is provided a computer program product for performing the method described herein.

It would be appreciated through the following description that with the embodiments of the present disclosure, the two-stage deduplication operation can not only enhance the deduplication speed, but also can reduce the overheads for metadata storage and management.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

A traditional data deduplication solution generally comprises three portions: block partitioning, hash calculation, and removal of redundant data. In the traditional deduplication technology, only a block partitioning-based deduplication solution is employed. For each file, regardless of whether similar historical files exist, it will be subject to block partitioning and then subject to the existing deduplication process, which is not only rather inefficient, but also consumes computational overheads. Meanwhile, a traditional block partitioning-based deduplication technology will generate mass metadata. Besides, the management and storage of these block-oriented metadata is also very complex, which will greatly restricts the scalability of the existing storage system.

In view of the above, the existing technology still has plenty of room to improve.

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
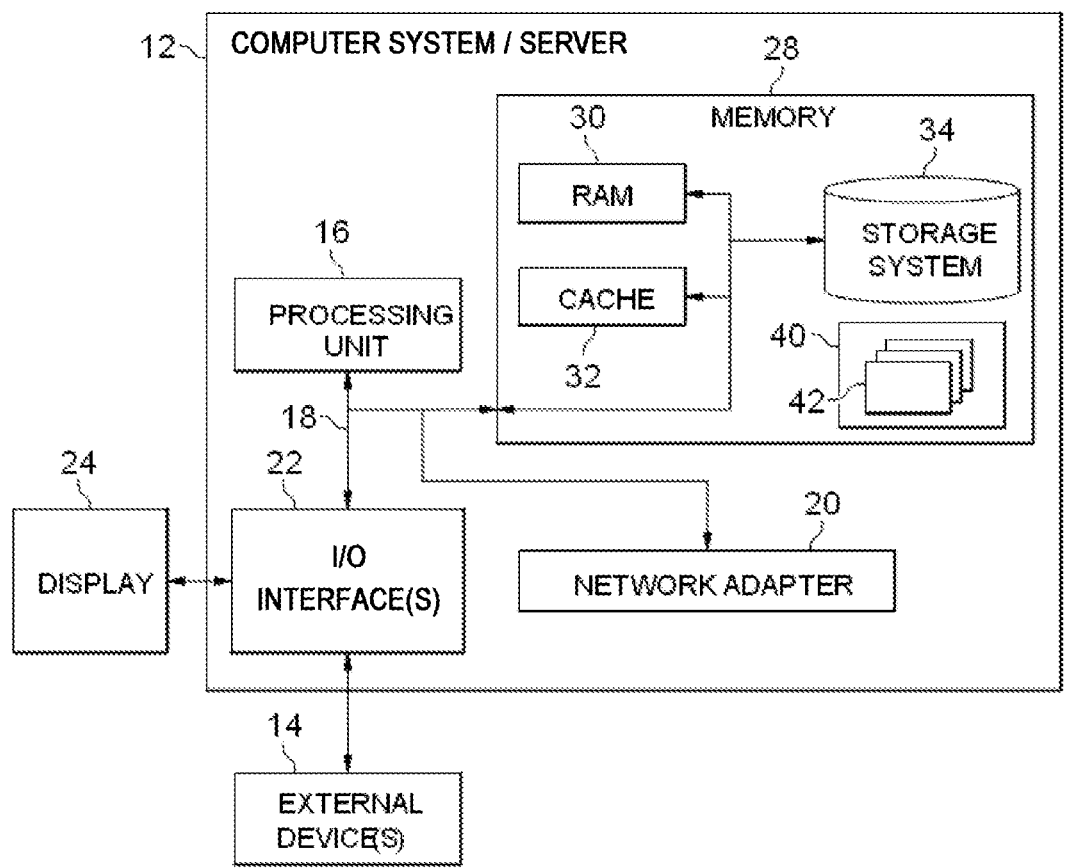
FIG. 1 shows a block diagram of an example computer system/server 12 which is applicable to implement the embodiments of the present disclosure.

Referring now to FIG. 1, an example computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
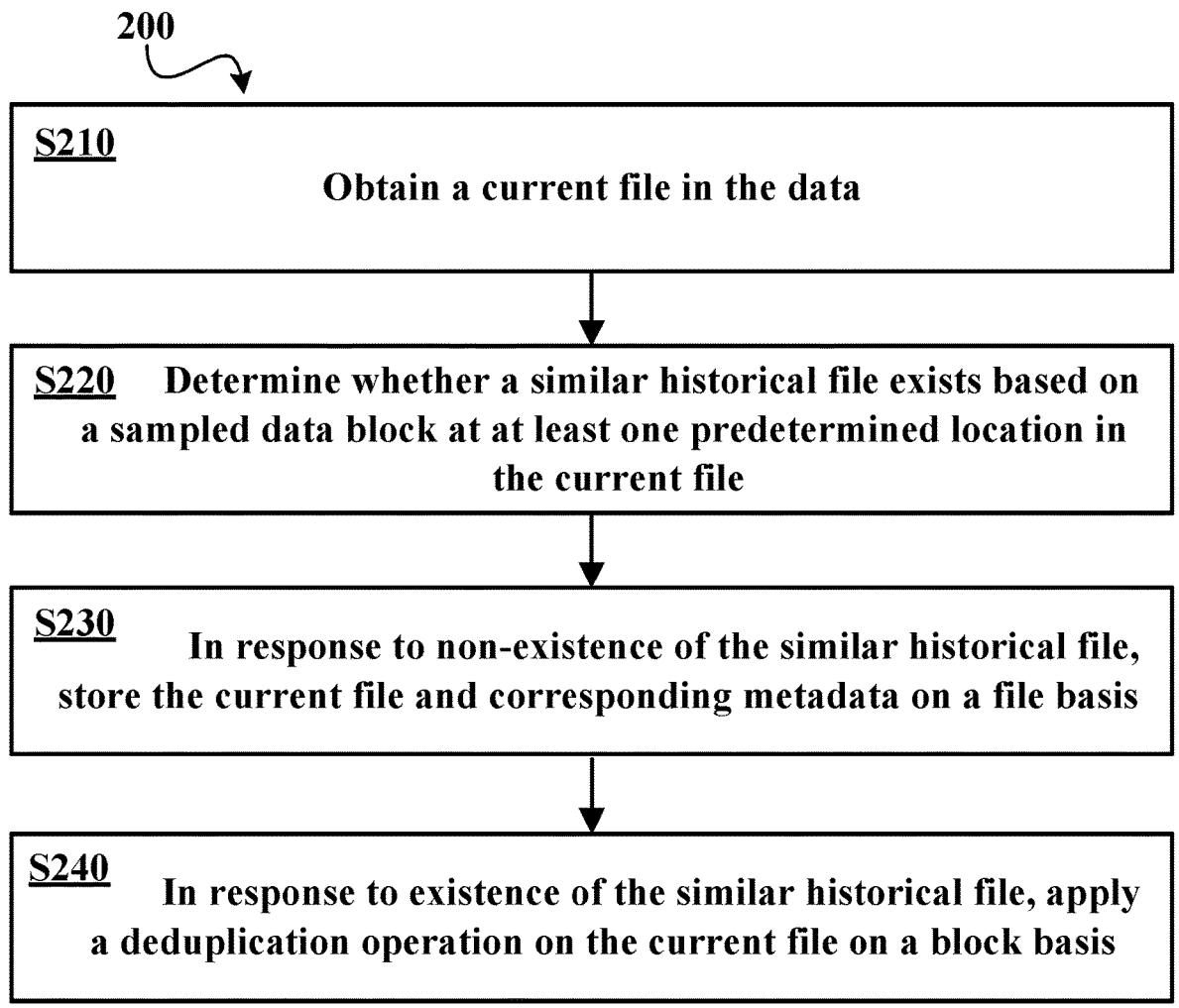
FIG. 2 shows a schematic flow diagram of a method 200 for data deduplication according to one example embodiment of the present disclosure.

FIG. 2 shows a schematic flow diagram of a method 200 for data deduplication according to one example embodiment of the present disclosure.

In step S210, a current file is obtained from the data.

In one embodiment, the deduplication processing may be performed to real-time generated data. In another embodiment, the file may be from already stored data, such that the deduplication processing according to the embodiment of the present application may be performed to the data stored based on the prior art.

In step S220, it is determined, based on a sample data block from at least one predetermined location in the current file, whether a similar historical file exists. The historical file in this step is the portion of data that has been stored and subject to deduplication processing, which is termed relative to the current file.

An objective of this step is to determine whether a similar historical file exists at a file level. This portion of file as determined is generally a picture, audio, video, compression file and like types that are not modified frequently. Specifically, it includes, but is not limited to, file formats such as bmp, gif, jpg, pic, png, tif, mp4, wav, avi, swf, rar, zip.

In this step, determination is performed through at least one sampled data block, which is more accurate compared to the manner of determining purely based on file metadata such as file name, file length. Meanwhile, compared with the block-based deduplication operation on all files in the prior art, it is more efficient.

The location of the sampled data block may be predetermined. Generally, the same size of data block is sampled at the same location for each file. In one embodiment, the predetermined location may be selected from at least one of the following: file head, any location in the file (e.g., ¼ location, ¾ location at the file, etc.), and file end. The size of the data block may also be preset. Generally, the smaller the data block is, the more accurate and efficient the sampling process is. In one embodiment, the size of the sampled data block is selected to 1 KB.

Figure 3:
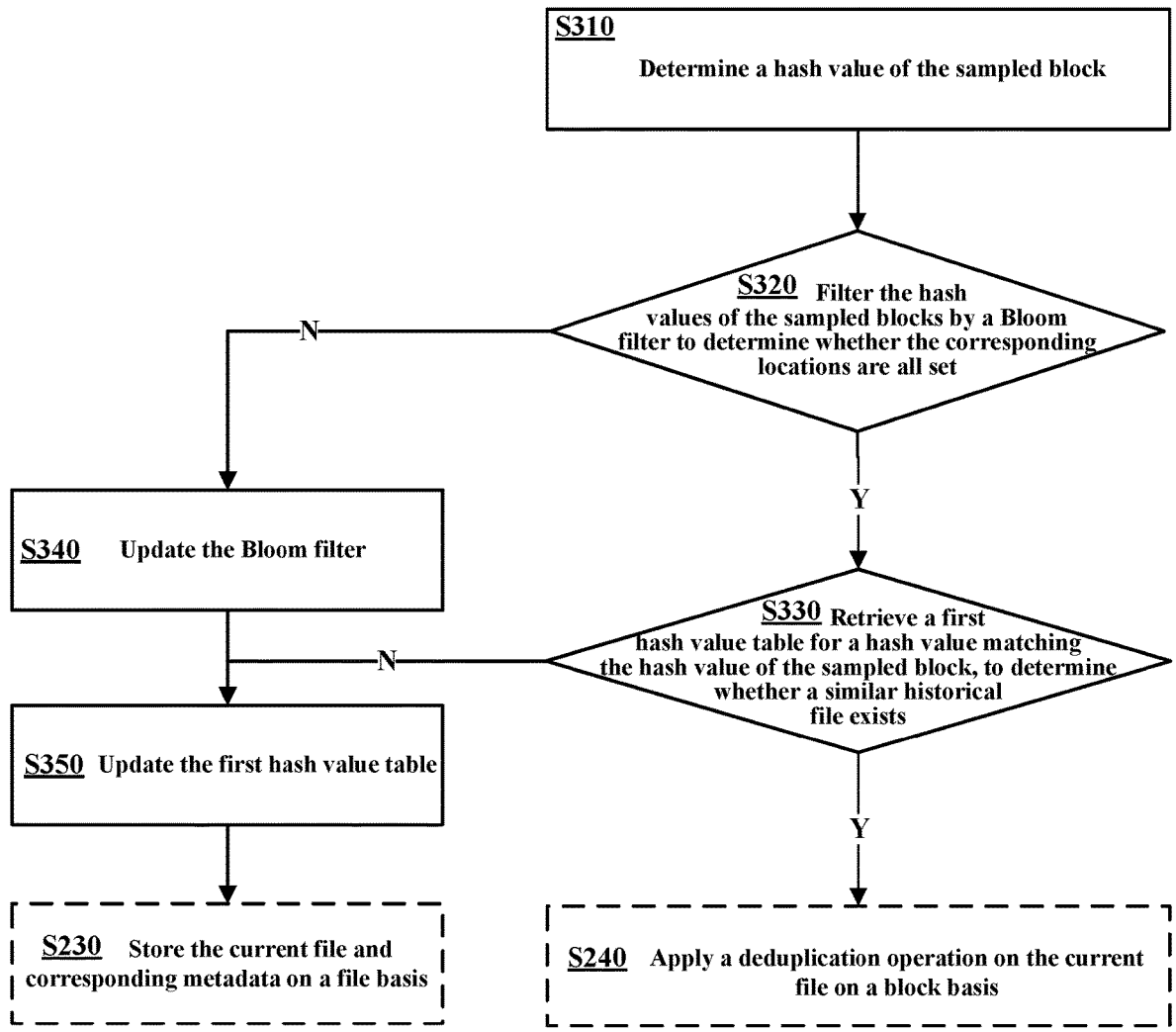
FIG. 3 shows a schematic flow diagram of step 220 in FIG. 2 according to one example embodiment of the present disclosure.

FIG. 3 shows a schematic flow diagram of step 220 in FIG. 2 according to one example embodiment of the present disclosure. FIG. 3 also illustrates step S230 and step S240 from FIG. 2 in dotted lines to indicate the relationship between FIG. 3 and FIG. 2. The method shown in FIG. 3 specifically includes:

Step S310, a hash value of the sampled data block is determined.

As known to those skilled in the art, a big data set may be mapped onto a small data set (such small data set is called a hash value) through a hash function. A hash table is a data structure that is directly accessible based on a hash value (key value), which accesses a record through mapping the hash value to a location in the table, so as to facilitate the search speed.

In one embodiment, a hash value for each data block may be generated using a common hash algorithm such as SHA-1, MD5, Tiger Hash or SHA-256.

When a common hash algorithm is adopted, even if the data blocks are similar, the hash values are totally different. Therefore, a SimHash algorithm is adopted in one improved embodiment to calculate the SimHash value of each sampled data block. Adoption of the SimHash may evaluate the similarity degree of each sampled data block. In one embodiment, the similarity degree may be determined based on the Hamming distance between SimHash values, wherein the Hamming distance is a number of different bits in two binary strings. However, the specific SimHash algorithm is a known technology, and those skilled in the art may comprehensively consider the storage cost and the data set size to select an appropriate number of bits for SimHash, which Applicant will not detail here.

In step S320, the hash value of the sampled data block is mapped to a corresponding location of a preset Bloom filter to determine whether the corresponding locations are all set.

The Bloom filter is a rapid search algorithm based on hash function mapping, and it is usually applied to a scenario that needs to rapidly determine whether an element belongs to a set, but it does not strictly require 100% correctness. Specifically, a Bloom Filter is a bit vector based on a m bit (b1, . . . bm), and the initial value of the bit vector is 0. There are further a series of hash functions (h1, . . . hk). The value ranges of these hash functions belong to 1~m; when k is 1, the hash conflict ration increases; therefore, a relatively large k value may be taken so as to mitigate the impact of hash conflict through more hash functions. For an example illustration, suppose m=18, k=3; when x is inserted, the three hash functions result in three bit values corresponding to the bit vectors, respectively, and setting the corresponding bit vectors (changed to be 1); when inserting y, z, similarly, the bit vectors at corresponding locations are changed to 1. When retrieving for x, if the bit vectors corresponding to three hash values of x are all 1, it is determined that x is in this dataset. When retrieving for w, one of a hash value of w has a corresponding bit vector being 0 (not all set), therefore, it may be determined that w is not in this set.

In this step, if corresponding locations are all set, the process goes into step S330; if corresponding locations are not all set, the process enters into step S340, where the Bloom filter is updated based on the hash value of the sampled data block.

In step S330, the first hash value table is retrieved for a hash value matching the hash value of the sampled data block, and whether a similar historical file exists is determined based on the retrieved result, the first hash value table recording the hash value of the sampled data block of the historical file at the predetermined location.

In this step, those matching the hash value of the sampled data block may include the same hash value or a similar hash value satisfying a certain similarity threshold; then, a similarity degree of the file is determined based on the statistical result of identity or similarity of the data block. When the similarity of the file determined based on the data block reaches a certain threshold, it may be determined that a similar historical file exists. If a similar historical file does not exist, the process goes into step S350; if a similar historical file exists, the process goes into the step S240 as shown in the dotted-line block to perform deduplication operation on the current file on a block basis.

In a concrete embodiment of the present disclosure, step S330 of determining whether a similar historical file exists based on the statistical result of the match of the data block may comprise the following two sub-steps: in sub-step 1, in response to a number of matched hash values as retrieved not exceeding the second threshold, it is determined that a similar historical file does not exist. In sub-step 2, in response to a number of matched hash values as retrieved exceeding the second threshold, it is determined that a similar historical file exists.

As introduced above, the matching in this embodiment comprises at least one of finding an identical hash value and finding a similar hash value. When a common hash algorithm is employed, even when the data blocks are similar, the hash values are totally different. Therefore, it is needed to count the number of identical hash values. When a SimHash algorithm is adopted, the similarity degree of the hash value of each data block can be determined. Therefore, the number of similar hash values may be counted based on the set hash value similarity degree threshold. As to how to calculate the similarity degree of SimHash, it is well known to those skilled in the art, whose specific implementation will not be detailed here. Besides, those skilled in the art may set, as needed, the threshold as requiring the hash values of all sampled data blocks are identical or similar, or the hash values of a part of sampled data blocks are identical or similar.

In step S340, the Bloom filter is updated based on the hash value of the sampled data block.

In step S350, the first hash value table is updated based on the hash value of the sampled data block, and then the process enters into the step S230 as illustrated in the dotted-line block to store the current file and corresponding metadata on a file basis. Through this step, the first hash value table can be updated based on the hash value of the sampled data block of the current file. In this way, after obtaining a subsequent file, whether it is identical to the stored current file can be determined based on the updated first hash value table.

It should be noted that in the embodiment illustrated in FIG. 3, the determination of file level similarity can be further accelerated through the Bloom filter. However, it is not essential. Therefore, steps 320 and 340 are optional steps.

Next, the process returns to step S230 of FIG. 2 to store the current file and corresponding metadata on a file basis in response to non-existence of a similar historical file.

In this step, the storage is performed on a file basis, and only the metadata at a file level is stored. For this part of file, compared with unanimously block-oriented storage manner in the prior art, great space for storing metadata will be saved, and the time required for a block-based deduplication operation for this part of file is also saved. Namely, in this step, similarity determination is only performed based on few sampled data blocks, which will save considerable time and computation overheads.

Examples of the metadata of a file are well known to those skilled in the art such as the name, length, access time, modification time, author information and the like of the file. Applicant will not enumerate it.

In one embodiment, non-existence of a similar historical file indicates that the current file is a new file; and the first hash value table may also be updated based on the hash value of the sampled data block of the current file. In this way, after obtaining a subsequent file, whether it is identical to the stored current file may be determined based on the updated first hash value table.

In step S240, a deduplication operation on a block basis is made to the current file in response to existence of a similar historical file.

The deduplication operation adopted in this step is a solution existing in the prior art. However, because some files have been filtered through the preceding step, the processing needed for this step needn't be performed to all files, such that it is more efficient in processing. Meanwhile, it also becomes unnecessary to store metadata of all data blocks, such that a lot of overheads may also be saved on metadata management. The files processed in this part are generally txt, doc, pdf, html, source code file, and other easily modified text file types.

Figure 4:
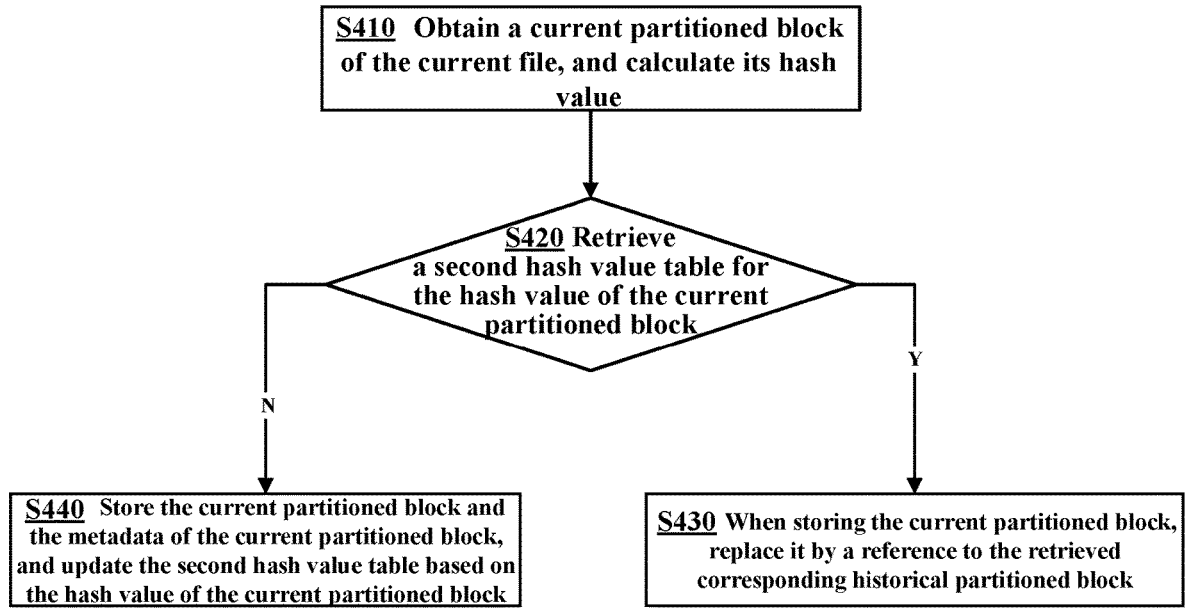
FIG. 4 shows a flow diagram of a traditional data block-based deduplication of step 240 in FIG. 2 according to one example embodiment of the present disclosure.

FIG. 4 shows a schematic flow diagram of a traditional data block-based deduplication in step S240 in FIG. 2 according to an example embodiment of the present disclosure. The traditional deduplication method needs to generate the hash value of each data block. The method as shown in FIG. 4 comprises:

In step S410, a current partitioned block of the current file is obtained, and a hash value of the current partitioned block is calculated. Those skilled in the art may select an appropriate manner of partitioning the file into blocks. Specifically, the block partitioning manner for a file may comprise one of the following: fixed block partitioning, variable length block partitioning, and content-based block partitioning, wherein the content-based block partitioning manner is very common.

A hash value for each block is calculated through a hash algorithm. The adopted hash algorithm includes, but not limited to, a Secure Hash Algorithm (SHA-1, SHA-256, and SHA-512), a Message Digest (MD5), and other algorithms. In order to avoid hash conflict, the algorithm of determining a hash value in this step may be a hash algorithm having a higher bit number.

In step S420, it is retrieved in a second hash value table for the existence of the hash value of the current partitioned block. The second hash value table records hash values of all data blocks in a historical file. Compared with the first hash value table only storing the hash values of the sampled data blocks, the second hash value table has a larger size.

In step S430, in response to existence, it is believed that the current partitioned block is redundant, and the current partitioned block is deleted; when the current partitioned block is stored, it is replaced by a reference to a historical block corresponding thereto. In one embodiment, a pointer pointing to the historical block indicates the reference to the historical block.

In step S440, in response to non-existence, the current partitioned block and metadata of the current partitioned block are stored. In one embodiment, there further comprises updating a second hash value table based on a hash value of the current partitioned block, e.g., inserting the hash value of the current partitioned block into the second hash value table.

Examples of metadata of the data block are also well known to those skilled in the art, such as the file to which the data block belongs, the location in the file, the hash value, the length, the storage time, the reference times, the access time, etc. Applicant will not enumerate all of them.

Figure 5:
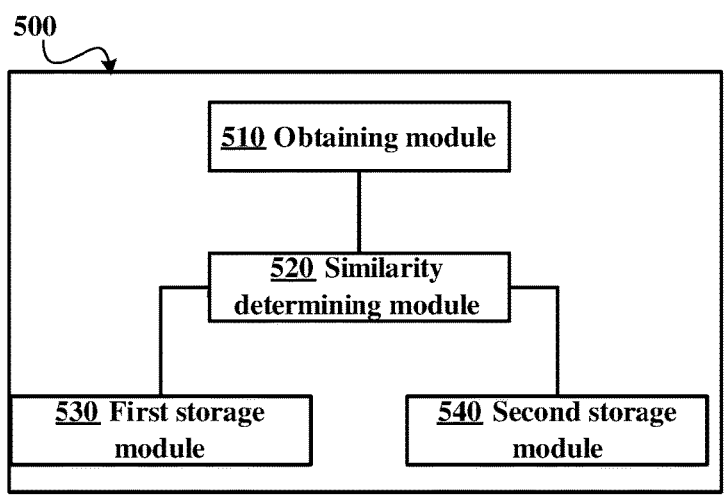
FIG. 5 shows a schematic block diagram of an apparatus 500 for data deduplication according to one example embodiment of the present disclosure.

FIG. 5 shows a schematic block diagram of an apparatus 500 for data deduplication according to an example embodiment of the present disclosure. According to the embodiments of the present disclosure, the apparatus 500 may comprise:

an obtaining module 510 configured to obtain a current file in the data;

a similarity determining module 520 configured to determine whether a similar historical file exists based on a sampled data block from at least one predetermined location in the current file;

a first storage module 530 configured to, in response to non-existence of the similar historical file, store the current file and corresponding metadata on a file basis; and a second storage module 540 configured to, in response to existence of the similar historical file, apply a deduplication operation on the current file on a block basis.

In one embodiment, the similarity determining module 520 comprises: a module configured to determine a hash value of the sampled data block; and a module configured to retrieve a first hash value table for a hash value matching the hash value of the sampled data block and determine whether a similar historical file exists based on a statistical result of the matching, the first hash value table recording a hash value of the sampled data block of the historical file at the predetermined location.

In a more specific embodiment, the module configured to determine a hash value of the sampled data block comprises a module configured to determine a SimHash value of said sampled data block; in the module configured to retrieve a first hash value table for a hash value matching the hash value of the sampled data block and determine whether a similar historical file exists based on a statistical result of the matching, the matching comprises retrieving a hash value whose similarity degree to the SimHash value of the sampled data block exceeds a first set threshold.

In a further more specific embodiment, the module configured to determine a hash value of the sampled data block comprises a module configured to determine a common hash value of the sampled data block; and in the module configured to retrieve a first hash value table for a hash value matching the hash value of the sampled data block and determine whether a similar historical file exists based on a statistical result of the matching, the matching comprises retrieving a hash value exactly identical to the common hash value of the sampled data block.

In one embodiment, the module configured to retrieve a first hash value table for a hash value matching the hash value of the sampled data block and determine whether a similar historical file exists based on a statistical result of the matching comprises: a module configured to determine, in response to retrieving that the number of matched hash values exceeds the second threshold, that a similar historical file does not exist; and a module configured to determine, in response to retrieving that the number of matched hash values exceeds the second threshold, that a similar historical file exists.

In one embodiment, there further comprises: a module configured to map the hash value of the sampled data block to a preset corresponding location of a Bloom filter, and determine whether the corresponding locations are all set; a module configured to enter into the first storage module in response to the corresponding locations are all set; and a module configured to determine, in response to the corresponding locations are not all set, that a similar historical file does not exist, and update the Bloom filter based on the hash value of the sampled data block.

In one embodiment, the second storage module 540 comprises: a module configured to obtain a current partitioned block of the current file and calculate a hash value of the current partitioned block; a module configured to retrieve a second hash value table for the existence of the hash value of the current partitioned block, the second hash value table recording hash values of all data blocks in a historical file; a module configured to, in response to existence, when the current partitioned block is stored, replace it by a reference to the retrieved corresponding historical partitioned block; a module configured to, in response to non-existence, store the current partitioned block and metadata of the current partitioned block.

In one embodiment, at least one predetermined location comprises at least one of the following: file head, any location in the file, and file end.

In a further embodiment, partitioned blocks of a file are determined by one of the following block partitioning manners: fixed partitioned block, variable-length partitioned block, and content-based partitioned block.

The granularity for file-oriented storage is a file, and the granularity for block-oriented storage is a block. The method or apparatus of the present application can effectively determine a part of files to be deduplicated at the file level and another part to be deduplicated at the block level, which can greatly save the computational overheads, and effectively optimize metadata management.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for data deduplication, the method comprising:
   obtaining a first single current file in the data;
   determining whether a similar historical file exists for the first single current file based on a first sampled data block from at least one predetermined location in the first single current file;
   based on determining non-existence of the similar historical file for the first single current file, storing the first single current file and corresponding metadata on a file basis without performing a deduplication operation on the first single current file;
   obtaining a second single current file in the data;
   determining whether a similar historical file exists for the second single current file based on a second sampled data block from at least one predetermined location in the second single current file; and
   based on determining existence of the similar historical file for the second single current file, applying the deduplication operation on the second single current file on a block basis.

2. The method according to claim 1, wherein the determining whether the similar historical file exists for the first single current file based on the sampled data block from at least one predetermined location in the first single current file comprises:
   determining a hash value of the first sampled data block; and
   retrieving a first hash value table for a hash value matching the hash value of the first sampled data block and determining whether a similar historical file exists based on a statistical result of the matching, the first hash value table recording hash values of sampled data blocks of historical files at the predetermined location.

3. The method according to claim 2, wherein the determining the hash value of the first sampled data block comprises determining a SimHash value of the first sampled data block, and wherein the matching comprises retrieving a hash value whose similarity degree to the SimHash value of the first sampled data block exceeds a first set threshold.

4. The method according to claim 2, wherein the determining the hash value of the first sampled data block comprises determining a common hash value of the first sampled data block, and wherein the matching comprises retrieving a hash value identical to the common hash value of the first sampled data block.

5. The method according to claim 2, wherein the determining whether the similar historical file exists based on the statistical result of the matching comprises:
   determining, in response to retrieving that a number of matched hash values does not exceed a second threshold, that a similar historical file does not exist; and
   determining, in response to retrieving that the number of matched hash values exceeds the second threshold, that a similar historical file exists.

6. The method according to claim 1, further comprising:
   determining a hash value of the first sampled data block;
   mapping the hash value of the sampled data block to a preset corresponding location of a Bloom filter, and determining whether corresponding locations are all set;
   in response to determining that the corresponding locations are not all set:
      determining that a similar historical file does not exist, and
      updating the Bloom filter based on the hash value of the first sampled data block; and
   in response to determining that the corresponding locations are all set:
      retrieving a first hash value table for a hash value matching the hash value of the first sampled data block, and
      determining whether a similar historical file exists based on a statistical result of the matching, the first hash value table recording hash values of sampled data blocks of historical files at the predetermined location.

7. The method according to claim 1, wherein the in response to determining existence of the similar historical file for the second single current file, applying a deduplication operation on the second single current file on a block basis comprises:
   obtaining a current partitioned block of the second single current file and calculating a hash value of the current partitioned block;
   retrieving a second hash value table for the existence of the hash value of the current partitioned block, the second hash value table recording hash values of all data blocks in a historical file;
   in response to existence, when the current partitioned block is stored, replacing it by a reference to the retrieved corresponding historical partitioned block; and
   in response to non-existence, storing the current partitioned block and metadata of the current partitioned block.

8. The method according to claim 7, wherein partitioned blocks of the file are determined by a block partitioning manner selected from the group consisting of fixed partitioned block, variable-length partitioned block, and content-based partitioned block.

9. An apparatus for data deduplication, comprising:
   one or more hardware processors;
   an obtaining module configured to obtain a current file in the data;
   a similarity determining module configured to determine whether a similar historical file exists based on a sampled data block from at least one predetermined location in the single current file;
   a first storage module configured to, based on determining non-existence of the similar historical file, store the single current file and corresponding metadata on a file basis without performing a deduplication operation on the single current file; and
   a second storage module configured to, based on determining existence of the similar historical file, apply the deduplication operation on the single current file on a block basis.

10. The apparatus according to claim 9, wherein the similarity determining module comprises:
   a module configured to determine a hash value of the sampled data block; and
   a module configured to retrieve a first hash value table for a hash value matching the hash value of the sampled data block and determine whether a similar historical file exists based on a statistical result of the matching, the first hash value table recording hash values of sampled data blocks of historical files at the predetermined location.

11. The apparatus according to claim 10, wherein the module configured to determine the hash value of the sampled data block comprises a module configured to determine a SimHash value of said sampled data block, and wherein the matching comprises retrieving a hash value whose similarity degree to the SimHash value of the sampled data block exceeds a first set threshold.

12. The apparatus according to claim 10, wherein the module configured to determine the hash value of the sampled data block comprises a module configured to determine a common hash value of the sampled data block and wherein the matching comprises retrieving a hash value exactly identical to the common hash value of the sampled data block.

13. The apparatus according to claim 11, wherein the module configured to retrieve the first hash value table for the hash value matching the hash value of the sampled data block and determine whether the similar historical file exists based on the statistical result of the matching comprises:
   a module configured to determine, in response to retrieving that a number of matched hash values does not exceed a second threshold, that a similar historical file does not exist; and
   a module configured to determine, in response to retrieving that the number of matched hash values exceeds the second threshold, that a similar historical file exists.

14. The apparatus according to claim 9, further comprising:
   a module configured to determine a hash value of the sampled data block;
   a module configured to map the hash value of the sampled data block to a preset corresponding location of a Bloom filter, and determine whether corresponding locations are all set;
   a module configured to, in response to the corresponding locations are not all set:
      determine that a similar historical file does not exist, and
      update the Bloom filter based on the Hash value of the sampled data block; and
   a module configured to, in response to determining that the corresponding locations are all set:
      retrieve a first hash value table for a hash value matching the hash value of the sampled data block, and
      determine whether a similar historical file exists based on a statistical result of the matching, the first hash value table recording hash values of sampled data blocks of historical files at the predetermined location.

15. The apparatus according to claim 9, wherein the second storage module comprises:
   a module configured to obtain a current partitioned block of the single current file and calculate a hash value of the current partitioned block;
   a module configured to retrieve a second hash value table for the existence of the hash value of the current partitioned block, the second hash value table recording hash values of all data blocks in a historical file;
   a module configured to, in response to existence, when the current partitioned block is stored, replace it by a reference to the retrieved corresponding historical partitioned block; and
   a module configured to, in response to non-existence, store the current partitioned block and metadata of the current partitioned block.

16. The apparatus according to claim 9, partitioned blocks of the file are determined by a block partitioning manner selected from the group consisting of fixed partitioned block, variable-length partitioned block, and content-based partitioned block.

17. A computer program product for data deduplication, the computer program product comprising a computer readable storage medium having program code embodied therewith, the program code executable by one or more processors to perform a method comprising:
   obtaining a single current file in the data;
   determining whether a similar historical file exists based on a sampled data block from at least one predetermined location in the single current file;
   based on determining non-existence of the similar historical file, storing the single current file and corresponding metadata on a file basis without performing a deduplication operation on the single current file; and
   based on determining existence of the similar historical file, applying the deduplication operation on the single current file on a block basis.

18. The computer program product according to claim 17, wherein the determining whether the similar historical file exists based on the sampled data block from at least one predetermined location in the single current file comprises:
   determining a hash value of the sampled data block; and
   retrieving a first hash value table for a hash value matching the hash value of the sampled data block and determining whether a similar historical file exists based on a statistical result of the matching, the first hash value table recording a hash value of the sampled data block of the historical file at the predetermined location.

19. The computer program product according to claim 18, wherein the determining the hash value of the sampled data block comprises determining a SimHash value of the sampled data block, and wherein the matching comprises retrieving a hash value whose similarity degree to the SimHash value of the sampled data block exceeds a first set threshold.

20. The computer program product according to claim 18, wherein the determining whether the similar historical file exists based on the statistical result of the matching comprises:
   determining, in response to retrieving that a number of matched hash values does not exceed a second threshold, that a similar historical file does not exist; and
   determining, in response to retrieving that the number of matched hash values exceeds the second threshold, that a similar historical file exists.

* * * * *